UNITED STATES PATENT OFFICE.

CARL HOEPFNER, OF FRANKFORT-ON-THE-MAIN, GERMANY; HENRY ORTH, JR., ADMINISTRATOR OF SAID HOEPFNER, DECEASED.

PROCESS OF SEPARATING ALKALI-METAL SULFATES FROM MIXED SOLUTIONS.

SPECIFICATION forming part of Letters Patent No. 704,036, dated July 8, 1902.

Application filed September 27, 1899. Serial No. 731,853. (No specimens.)

*To all whom it may concern:*

Be it known that I, CARL HOEPFNER, a subject of the Emperor of Germany, residing at Frankfort-on-the-Main, Germany, have invented certain new and useful Improvements in Processes of Separating Alkali-Metal Sulfates from Mixed Solutions; and I do hereby declare the following to be a full, clear, and exact description of the invention, such as will enable others skilled in the art to which it appertains to make and use the same.

This invention relates to the separation of alkali-metal sulfates from mixed solutions.

I have found that in the practical leaching of ores of zinc and similar metals with sulfurous or sulfuric acids and in the subsequent conversion of the resulting sulfate or sulfite into a chlorid by means of a chlorid of an alkali metal with the simultaneous formation of an alkali-metal sulfate by double decomposition it was a very difficult matter to separate the zinc chlorid from the alkali-metal sulfate, especially when concentrated solutions of salts were used.

Heretofore it has been impossible to separate the alkali-metal sulfate contained in concentrated solutions, together with zinc and similar metals, by cooling, because such cooling was gradual and resulted in the crystallizing out of a double sulfate of the alkali and a metal, in the case of zinc with the formation of $ZnSO_4, Na_2SO_4$, from which the recovery of zinc is difficult. I have found that when mixed solutions of such salts are cooled rapidly or suddenly, and especially with concentrated solutions, the metal is not precipitated, but only the sulfate of the alkali metal. I cool these mixed solutions rapidly by allowing them to flow into a solution of a chlorid, as NaCl or $ZnCl_2$, which contain from ten per cent. to twenty per cent. of sodium chlorid and from ten per cent. to twenty per cent. of zinc in the form of chlorid or a mixture of both constantly stirred and kept cold below 10° centigrade and preferably below 0°. This is conveniently done by allowing the mixed solutions of zinc sulfate and alkali-metal sulfate to flow in a comparatively small stream into a solution of chlorid, as zinc chlorid, constantly stirred, and the temperature of which is preferably kept below 0° centigrade by any suitable cooling medium, as ammonia from an ice-machine circulating in pipes around or through the vessel containing the chlorid bath. The mixed sulfate solution is thus immediately stirred into the cold bath and brought to the temperature of said bath. The size of the stream of mixed solutions which measures the quantity must be regulated in accordance with the quantity of the solution of the chlorid salt used as bath. The chemist in charge can easily determine this by observing the separation of the alkali-metal sulfate, and experience will determine the permissible fluctuations of temperature of bath and variations in concentrations. The chlorid solutions are drawn off from time to time and the alkali-metal sulfate crystals removed, or they may be shoveled from the bath from time to time.

In the process of cooling it is of course necessary to have a refrigerating-machine, and in such it is customary to cool the expanded gases by means of water, which will reduce their temperature to approximately 10° centigrade. In order to still further cool them, I propose to use the cold solutions containing metals after the alkaline sulfate has been separated.

Having thus described my invention, what I claim as new therein, and desire to secure by Letters Patent, is—

1. The method of separating alkaline sulfates from mixed solutions, which consists in rapidly cooling the same by allowing them to flow into a cold solution of a suitable chlorid, thereby preventing the formation of double salts, substantially as set forth.

2. The method of separating alkaline sulfates from mixed solutions, which consists in rapidly cooling the same by allowing them to flow into a suitable cold chlorid solution while being constantly stirred, substantially as set forth.

3. The method of separating alkali-metal sulfates from mixed solutions of high concentration, which consists in rapidly cooling the same by allowing them to flow into a cold solution of a suitable chlorid while being constantly stirred, substantially as set forth.

4. The method of separating alkaline sulfates from mixed solutions, which consists in rapidly cooling the same by allowing them to flow into a cold solution of a chlorid while being constantly stirred, using the resulting cold solution to reduce the temperature of cooling-gases used in the refrigerating plant, substantially as set forth.

In testimony that I claim the foregoing as my invention I have signed my name in presence of two subscribing witnesses.

CARL HOEPFNER.

Witnesses:
  THOS. H. YOUNG,
  HENRY ORTH, Jr.